US012691818B2

(12) United States Patent
Song et al.

(10) Patent No.: US 12,691,818 B2
(45) Date of Patent: Jul. 28, 2026

(54) APPARATUS AND METHOD FOR REAR COMMUNICATION DISPLAY

(71) Applicant: HYUNDAI MOBIS CO., LTD., Seoul (KR)

(72) Inventors: Ki Ryong Song, Yongin-si (KR); Ji Soo Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 194 days.

(21) Appl. No.: 18/638,907

(22) Filed: Apr. 18, 2024

(65) Prior Publication Data

US 2025/0100443 A1 Mar. 27, 2025

(30) Foreign Application Priority Data

Sep. 25, 2023 (KR) ........................ 10-2023-0128261

(51) Int. Cl.
B60Q 1/50 (2006.01)
B60Q 1/52 (2006.01)
(52) U.S. Cl.
CPC ............. B60Q 1/5035 (2022.05); B60Q 1/52 (2013.01)
(58) Field of Classification Search
CPC ........ B60Q 1/5035; B60Q 1/52; B60Q 1/268; B60Q 2400/50; B60Q 1/2692; B60Q 1/5037; B60Q 1/507; B60Q 1/543; B60Q 1/544; B60Q 1/545; B60Q 1/503; B60Q 1/302; B60Q 1/547
See application file for complete search history.

(56) References Cited

U.S. PATENT DOCUMENTS

| | | | | |
|---|---|---|---|---|
| 5,905,434 | A * | 5/1999 | Steffan ................... | B60Q 1/545 |
| | | | | 116/28 R |
| 11,951,904 | B1 * | 4/2024 | Covarrubias ........ | B60Q 1/2615 |
| 2017/0003134 | A1 * | 1/2017 | Kim ...................... | G01S 19/485 |
| 2017/0229053 | A1 * | 8/2017 | Ishizuka .............. | G09G 3/2003 |
| 2022/0179432 | A1 * | 6/2022 | Nojoumian ............. | B60N 2/28 |

* cited by examiner

*Primary Examiner* — Omeed Alizada
(74) *Attorney, Agent, or Firm* — NovoTechIP International PLLC

(57) ABSTRACT

A rear communication display device according to an embodiment of the disclosure includes an information display optical system outputting communication display information to at least one of a rear glass or a trunk garnish disposed at a rear of a vehicle, and a controller determining a display mode for rear communication of the vehicle and outputting rear communication display information corresponding to the display mode. The controller determines the display mode as one of a manual mode in which communication display information is output through a user operation, and an automatic mode in which communication display information is output by determining a driving situation using navigation and camera information.

9 Claims, 10 Drawing Sheets

APPARATUS AND METHOD FOR REAR COMMUNICATION DISPLAY

CROSS-REFERENCE TO RELATED APPLICATIONS

This application is based on and claims priority under 35 U.S.C. § 119 to Korean Patent Application No. 10-2023-0128261, which was filed in the Korean Intellectual Property Office on Sep. 25, 2023, the entire disclosure of which is incorporated herein by reference.

TECHNICAL FIELD

The present embodiments are applicable to an autonomous vehicle in any field, and more particularly, for example, to a vehicle system including a projector.

BACKGROUND

The Society of Automotive Engineers (SAE), a U.S. automotive engineering organization, categorizes autonomous driving into six levels, from Level 0 to Level 5, as follows.

Level 0 (No Automation): the driver is in control of and responsible for all aspects of driving. The driver always drives, and the system of the autonomous vehicle only performs assistant functions such as emergency alerts. At this level, humans are in charge of controlling the driving, detecting changes during driving, and taking responsibility for driving.

Level 1 (Driver Assistance): the system assists the driver with adaptive cruise control and lane-keeping functions. When the system is activated, the autonomous vehicle maintains a speed, a following distance, and a lane to assist the driver. At this level, both humans and systems are in control of driving, and humans are responsible for detecting changes and driving.

Level 2 (Partial Automation): the autonomous vehicle may control steering, acceleration, and deceleration of the autonomous vehicle simultaneously with a human driver for a certain period of time under certain conditions. It is possible to steer on gentle curves and assist in maintaining a distance from the car in front. However, at this level, the human driver is still responsible for detecting variables during driving and taking charge of driving. Therefore, the human driver needs to monitor the driving situation at all times and intervene immediately in situations that the system does not recognize.

Level 3 (Conditional Automation): the system is responsible for driving under certain conditions, such as on a highway, and the driver only intervenes in case of danger. The system is responsible for driving control and detecting variables during driving and, unlike Level 2, does not require the above monitoring. However, beyond the system requirements, the system requests immediate intervention from the driver.

Level 4 (High Automation): autonomous driving is possible on most roads. The system has both driving control and driving responsibility. Driver intervention is not required on most roads except in limited circumstances. However, in certain conditions, such as severe weather, a human driver may be required to take control of the vehicle.

Level 5 (Full Automation): the driver is not required and the vehicle may be driven by the driver alone. The driver only enters a destination, and the system takes care of driving in all conditions. At Level 5, there is no need for control devices to steer, accelerate, or decelerate the autonomous vehicle.

The external display device of a conventional vehicle, such as the Tail, Stop, T/Sig, B/up, and CHMSL lamps on a rear area of the vehicle, convey information about each function. However, it is difficult to express detailed information other than position/stop-deceleration/forward/reverse, and since these functions are located within the rear lamp, information is represented in a limited small area relative to the total rear area of the vehicle.

SUMMARY

To address the problems described above, an embodiment of the disclosure is intended to provide a rear communication display device that provides information over a large area on a rear glass or trunk garnish area.

The problems to be solved by the disclosure are not limited to the above-mentioned technical problems, and other technical problems not mentioned will be clearly understood by those skilled in the art from the following description.

To address the above-described problems, a rear communication display device according to any one of embodiments of the disclosure includes an information display optical system outputting communication display information to at least one of a rear glass or a trunk garnish disposed at a rear of a vehicle, and a controller determining a display mode for rear communication of the vehicle and outputting rear communication display information corresponding to the display mode. The controller determines the display mode as one of a manual mode in which communication display information is output through a user operation, and an automatic mode in which communication display information is output by determining a driving situation using navigation and camera information.

According to an embodiment, in the manual mode, the controller displays a signal transmitted by the vehicle in an extended manner on at least one of the rear glass or the trunk garnish. The communication display information in the manual mode includes directional information, deceleration information, stop information, and reverse information.

According to an embodiment, in the automatic mode, the controller displays road condition information and emergency situation information learned in correspondence with a driving situation of the vehicle in an extended manner on at least one of the rear glass or the trunk garnish. The emergency situation information includes accident information and congestion information.

According to an embodiment, the information display optical system includes a first optical system module disposed in a portion of the vehicle where a top end portion of the rear glass meets a roof, and outputting communication display information to an area of the rear glass, a second optical system module disposed in an interior of the vehicle, and outputting communication display information to the area of the rear glass, and a third optical system module disposed within the trunk garnish, and outputting communication display information to a front surface of the trunk garnish.

According to an embodiment, a portion of the third optical system module protrudes a projector outward from within the trunk garnish to display the communication display information on the front surface of the trunk garnish.

According to an embodiment, the trunk garnish includes a fixed portion and a rotating portion. The third optical system module is disposed on a rear surface of the fixed portion. The rotating portion has a rotation shaft disposed at an end thereof and rotates in an inward direction of the vehicle through operation of a motor coupled to the rotation shaft. The third optical system module displays communication display information on a front surface of the rotating portion.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is an exemplary diagram illustrating an example of applying an autonomous driving device according to any one of embodiments of the disclosure to an autonomous vehicle;

FIG. 5 is a diagram illustrating the position of a rear communication display device according to an embodiment of the disclosure;

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
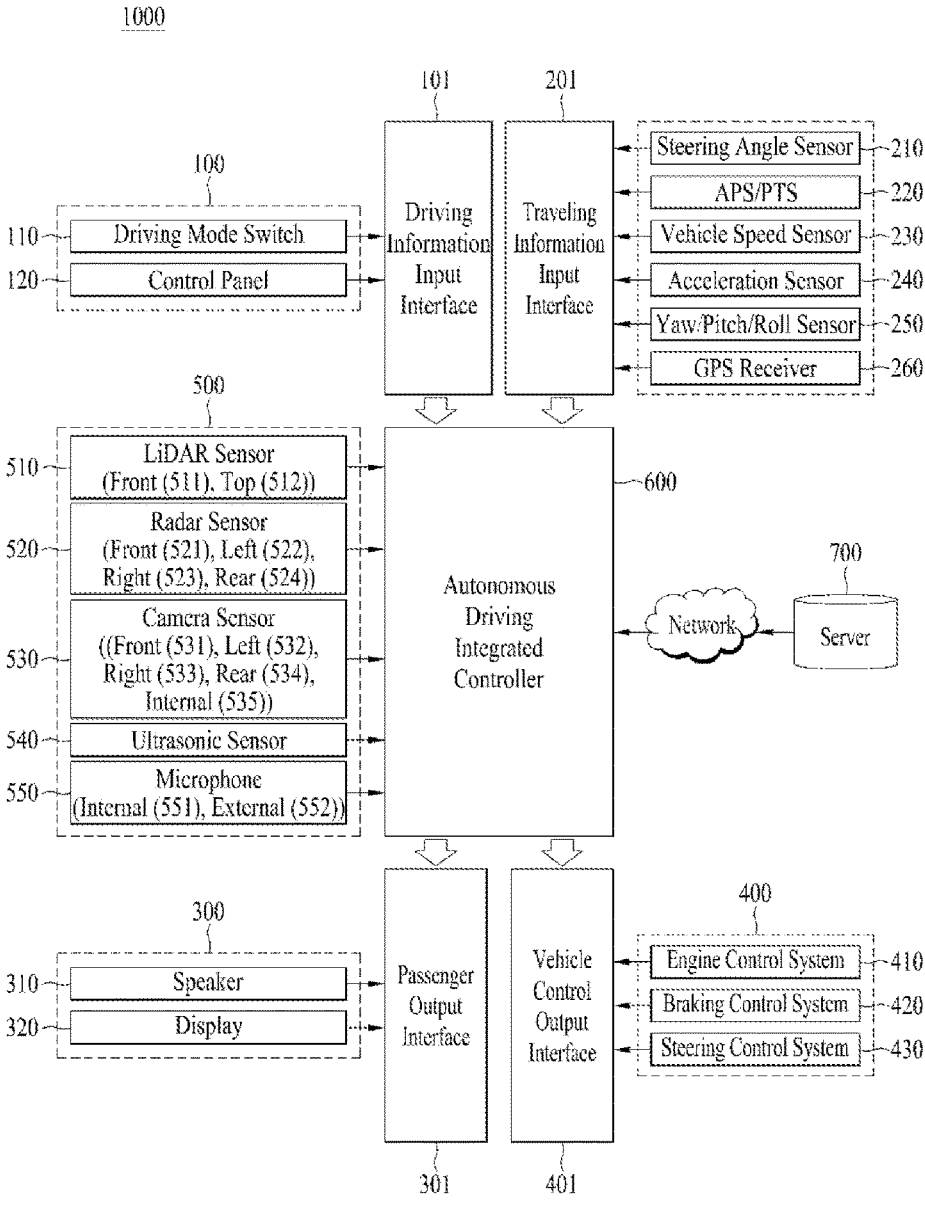
FIG. 1 is an overall block diagram illustrating an autonomous driving control system to which an autonomous driving device according to any one of embodiments of the disclosure is applicable.
Figure 2:
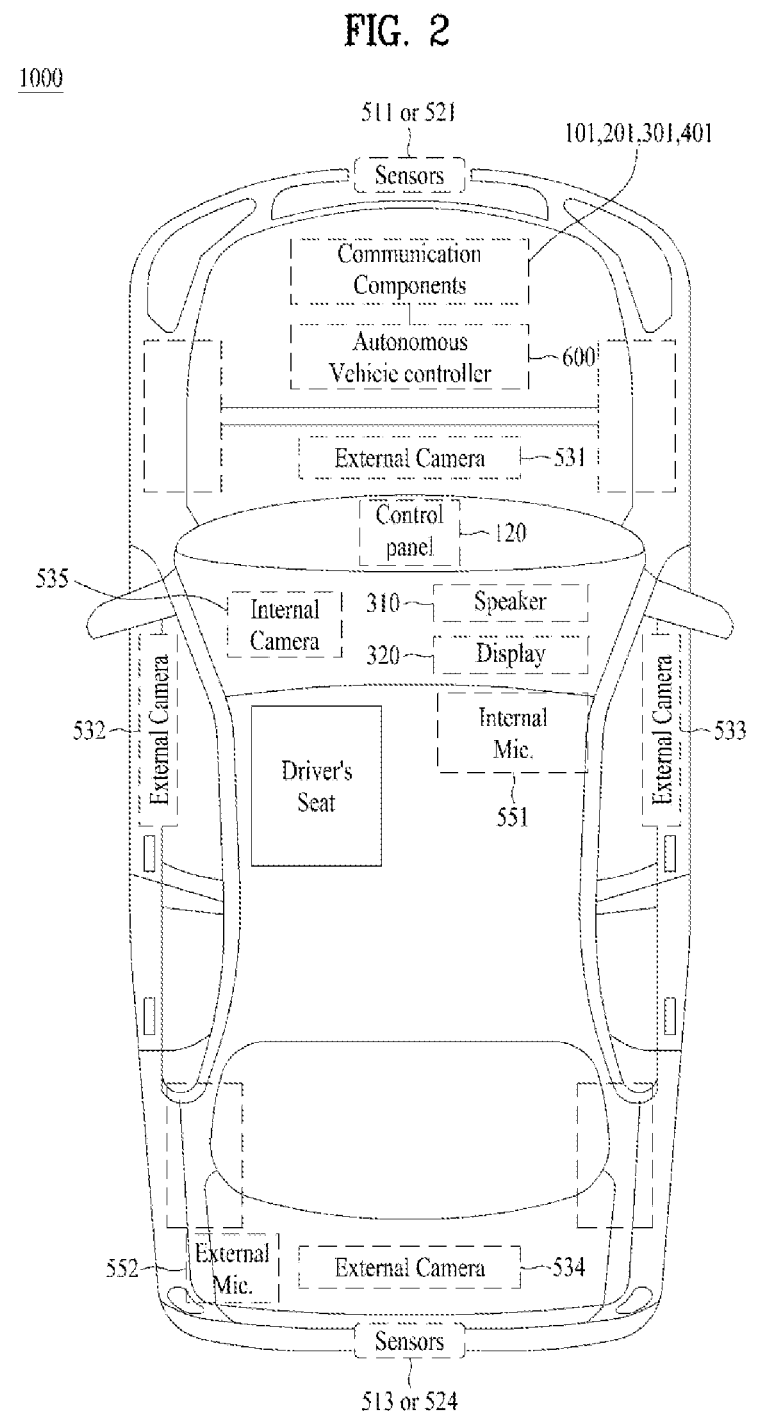

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/ safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/ pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
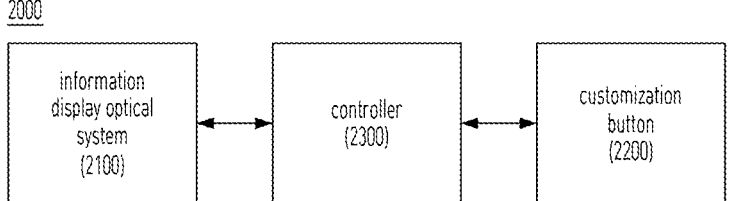
FIG. 3 is a block diagram illustrating a rear communication display device according to an embodiment of the disclosure.
Figure 4:
FIG. 4 is a diagram illustrating communication display information on a rear communication display device according to an embodiment of the disclosure.

FIG. 3 is a block diagram illustrating a rear communication display device according to an embodiment of the disclosure. FIG. 4 is a diagram illustrating communication display information on a rear communication display device according to an embodiment of the disclosure.

Referring to FIG. 3, a rear communication display device 2000 may include an information display optical system 2100, a customization button 2200, and a controller 2300.

The information display optical system 2100 may enable implementation of an image presentation concept on a rear surface portion of a vehicle. For example, the information display optical system 2100 may apply image displayable optics in a concept of various MEMS-based projected optics and a concept of a display using multiple LEDs, an OLED display, an LCD, or a micro lens array (MLA).

The customization button 2200 may classify communication display information displayable through the information display optical system 2100 into passenger information, emergency light A: forward information (accident/congestion), emergency light B: appreciation/yield, and so on, and select detailed information. As illustrated in FIG. 4, communication display information corresponding to the passenger information may include an image of an elderly person, an image of an infant, an image of a pregnant woman, and an image of a disabled person.

The customization button 2200 may be selected to light up special user-selected information at all times.

The controller 2300 may determine a display mode to be either a manual mode in which communication display information is displayed through a user operation or an automatic mode in which communication display information is displayed by determining a driving situation using navigation and camera information.

In the manual mode, the controller 2300 may control the information display optical system 2100 to display a signal transmitted by the vehicle in an expanded manner on at least one of a rear glass 2600 or a trunk garnish 2700. The controller 2300 may output directional information, deceleration information, stop information, and reverse information as communication display information in the manual mode.

In the automatic mode, the controller 2300 may control the information display optical system 2100 to display road condition information and emergency situation information learned in correspondence with a driving situation of the vehicle on at least one of the rear glass 2600 or the trunk garnish 2700. The emergency situation information includes at least one of accident information and congestion information.

In the automatic mode, the controller 2300 may output communication display information based on vehicle self-determination for each situation without driver intervention. The controller 2300 may output deceleration information, stop information, and reverse information as communication display information in conjunction with sensors in the vehicle in the automatic mode.

In the automatic mode, the controller 2300 may also control the information display optical system 2100 to determine a situation such as forward information (accident/congestion) and appreciation/yield based on situation-specific training data which has been learned, using navigation and camera information, and output communication display information corresponding to the determined situation.

The controller 2300 may select communication display information using autonomous vehicle navigation (AVN), a smart device, or the like. In this case, the communication display information may include an image shape such as a pictogram and an emoticon that is easily recognizable to anyone, and may be represented as text of a preset length and simple words.

Further, the controller 2300 may purchase various display contents and designs through a vehicle manufacturer's default specification, subscription, or a paid service, and output them as communication display information.

Figure 5:
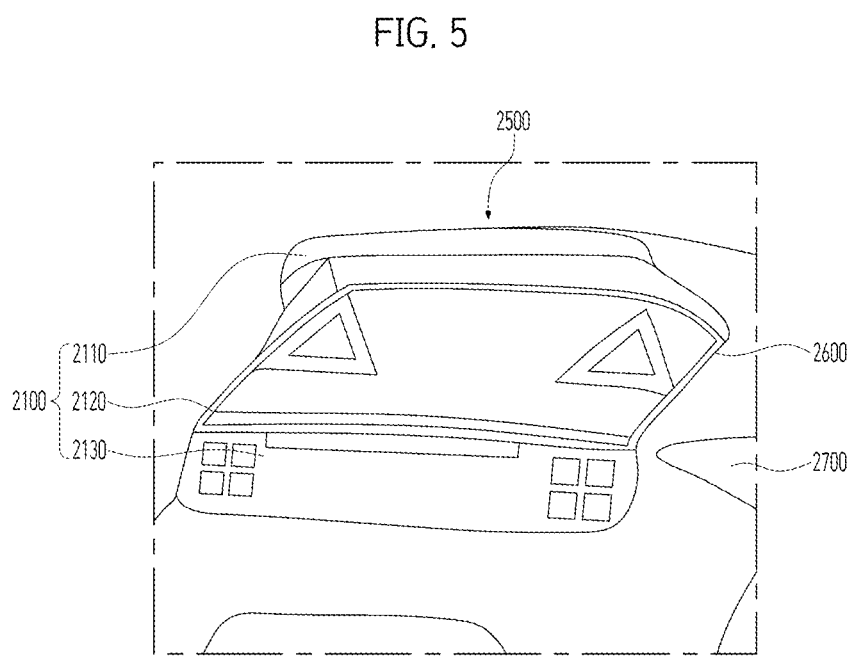
Figure 6:
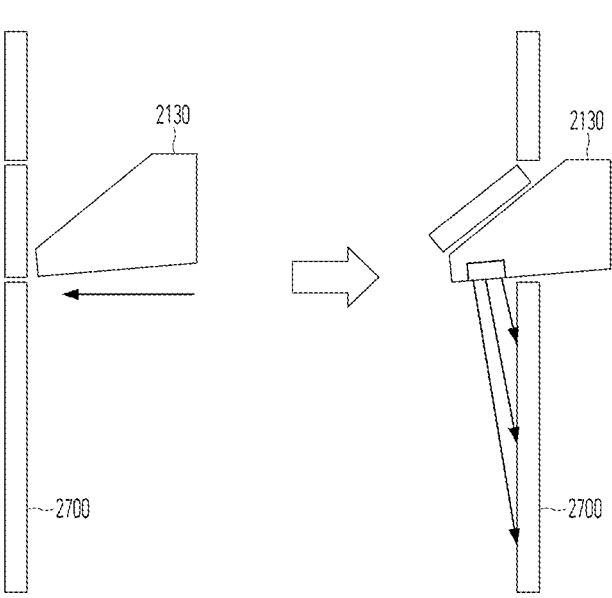
FIGS. 6 and 7 are diagrams illustrating an operation of a rear communication display device according to an embodiment of the disclosure.
Figure 7:
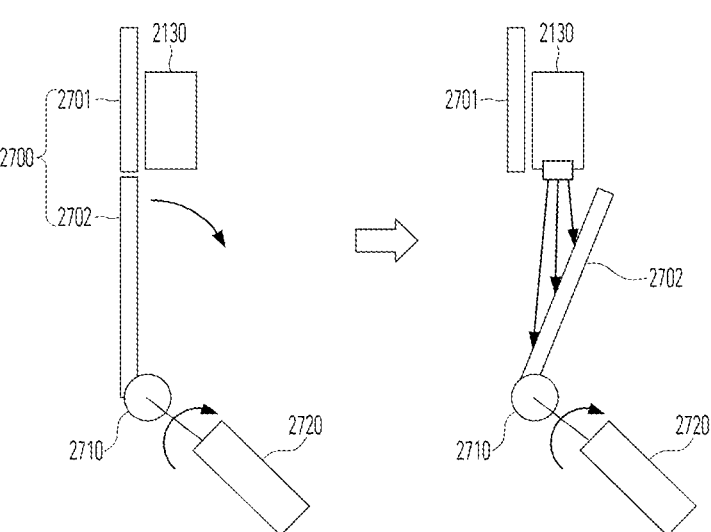

FIG. 5 is a diagram illustrating the position of a rear communication display device according to an embodiment of the disclosure. FIGS. 6 and 7 are diagrams illustrating an operation of a rear communication display device according to an embodiment of the disclosure.

Referring to FIG. 5, the information display optical system 2100 may be located at the rear of the vehicle and output communication display information. To this end, the information display optical system 2100 may be located to implement a seamless design concept. At least one information display optical system 2100 may be disposed in the vehicle.

A first optical system module 2110 may be located at a portion (a high mounted stop lamp (HMSL)) 2500 where a top end portion of the rear glass 2600 meets a roof. The first optical system module 2110 may output a representational image from the top end portion of the rear glass 2600 to display the representational image in an area of the rear glass 2600.

A second optical system module 2120 may be located in the interior of the vehicle. The second optical system module 2120 may output a representational image from the vehicle interior to display the representation image on an area of the rear glass 2600.

A third optical system module 2130 may be disposed inside the trunk garnish 2700 to display representational information on a surface of the trunk garnish 2700 corresponding to the rear of the vehicle.

Referring to FIG. 6, the third optical system module 2130 may protrude a projector 2131 from the interior of the trunk garnish 2700 to the exterior thereof by forward driving. The protruded projector 2131 may display representational information on the surface of the trunk garnish 270 corresponding to the rear of the vehicle as a screen.

Referring to FIG. 7, the trunk garnish 2700 may include a fixed portion 2701 and a rotating portion 2702. The third optical system module 2130 may be disposed on a rear surface of the fixed portion 2701 of the trunk garnish 2700. A rotation shaft 2710 is disposed at one end of the rotating portion 2702 of the trunk garnish 2700, and a motor 2720 coupled to the rotation shaft 2710 may be operated (or turned on) to rotate the rotating portion 2702 in an inward direction of the vehicle. The third optical system module 2130 may then display representational information on the surface of the trunk garnish 2700 corresponding to the rear of the vehicle as a screen.

According to an embodiment, a permeable paint or film coating may be disposed on the rear glass 2600. When the information display optical system 2100 outputs a representational image in an area of the rear glass 2600, an image output from the information display optical system 2100 may be displayed on the permeable paint or film coating, thereby offering the effect of securing the driver's rear view.

According to an embodiment, a film and paint for enhancing visibility may be disposed on the trunk garnish 2700. Therefore, when the information display optical system 2100 outputs a representational image in an area of the rear glass 2600, an image output from the information display optical system 2100 is displayed on the film and paint to improve the driver's visibility.

According to an embodiment, display positions of representational information within the area of the rear glass 2600 may be divided into the front surface and both side surfaces of the rear glass 2600. When representational information is displayed on the front surface of the rear glass 2600, a rear-view mirror of a digital concept may be used to secure the driver's rear view. In addition, representational information may be placed on both side surfaces to secure the driver's view in a center area.

Figure 8:
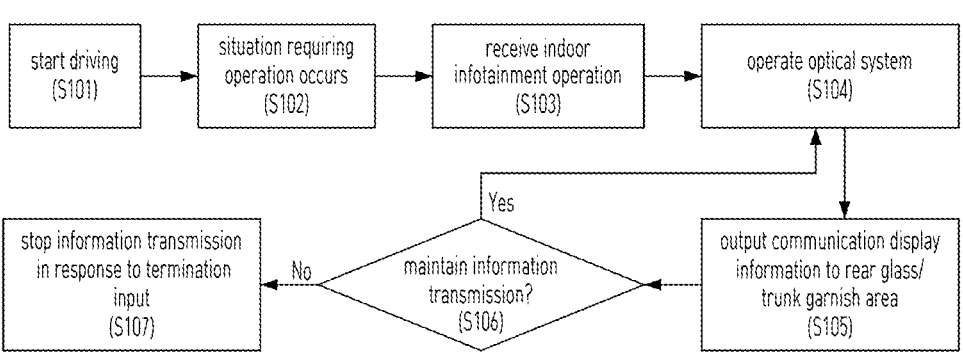
FIG. 8 is a diagram illustrating a manual operation mode of a rear communication display device according to an embodiment of the disclosure.

FIG. 8 is a diagram illustrating a manual operation mode of a rear communication display device according to an embodiment of the disclosure.

Referring to FIG. 8, upon occurrence of a situation requiring operation during driving of the vehicle, the rear communication display device 2000 may receive interior infotainment operation information according to a user operation (S101, S102, and S103).

After operation S103, the rear communication display device 2000 may operate the information display optical system 2100 and the trunk garnish 2700 (S104).

After operation S104, the rear communication display device 2000 may output communication display information to areas of the rear glass 2600 and the trunk garnish 2700 (S105).

After operation S105, the rear communication display device 2000 may indicate to an interior infotainment device whether to maintain the status of communication display information transmission (S106).

After operation S106, when failing to receive a termination input from the user (Yes in operation S106), the rear communication display device 2000 may keep the information display optical system 2100 and the trunk garnish 2700 operational (S103).

After operation S106, upon receipt of the termination input from the user (No in operation S106), the rear communication display device 2000 may stop transmitting communication display information (S107).

Figure 9:
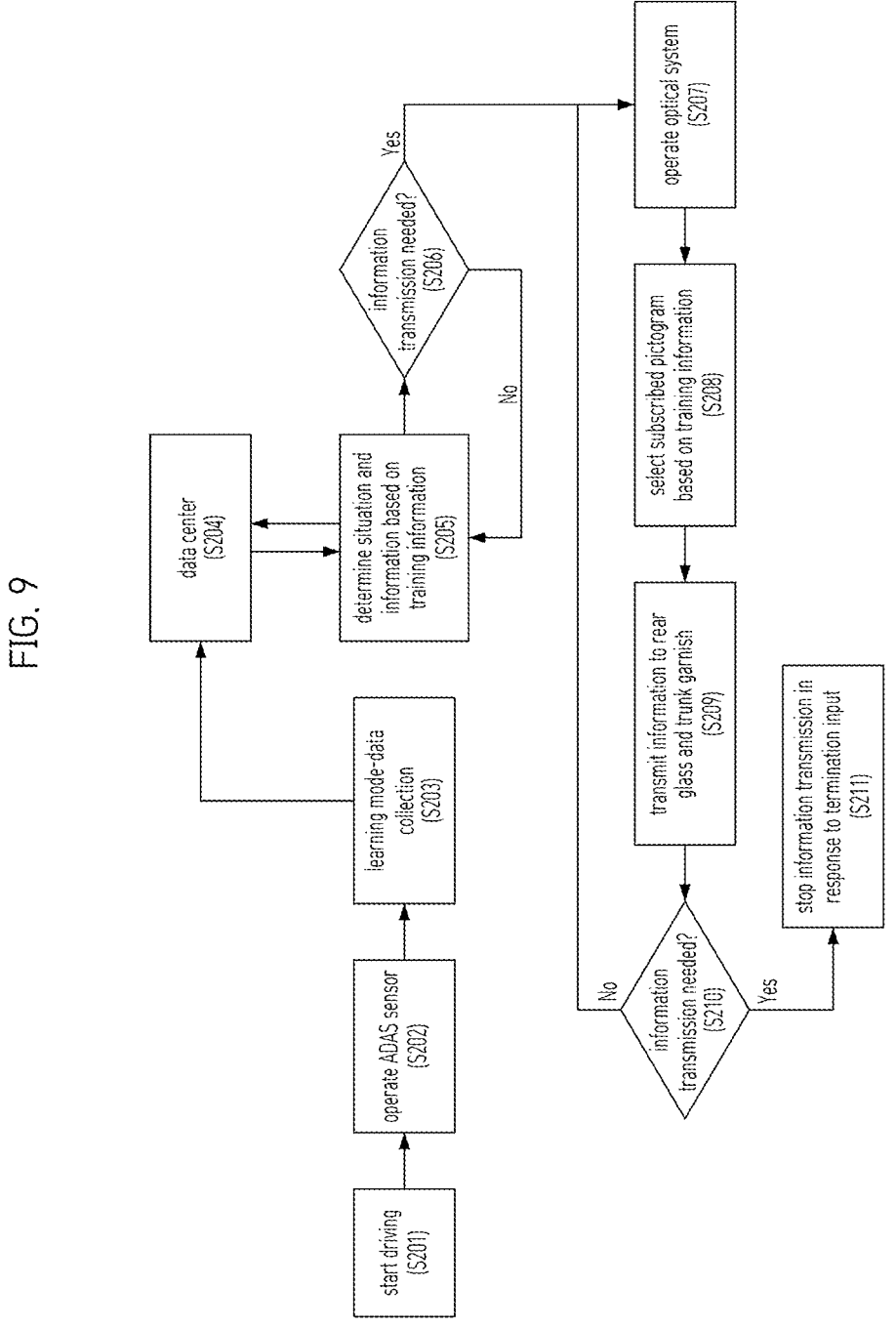
FIG. 9 is a diagram illustrating an automatic operation mode of a rear communication display device 2000 according to an embodiment of the disclosure.

FIG. 9 is a diagram illustrating an automatic operation mode of the rear communication display device 2000 according to an embodiment of the disclosure.

Referring to FIG. 9, when an advanced driving assisted systems (ADAS) sensor operates during driving of the vehicle, the rear communication display device 2000 may collect data according to a learning mode and transmit the collected data to a data sensor (S201, S202, S203, and S204). The collected data may include road condition information and emergency situation information according to the vehicle driving.

After operation S204, the rear communication display device 2000 may determine a driving situation and information based on training information (S205).

After operation S205, the rear communication display device 2000 may determine whether it is necessary to transmit communication display information (S206).

After operation S206, when the information transmission is not needed (No in operation S206), the rear communication display device 2000 may determine the driving situation and the information based on the training information (S205).

After operation S206, when the information transmission is needed (Yes in operation S206), the rear communication display device 2000 may operate the information display optical system 2100 and the trunk garnish 2700 (S207).

After operation S207, the rear communication display device 2000 may select a subscribed pictogram based on the training information (S208).

After operation S208, the rear communication display device 2000 may output the selected pictogram as communication display information to the areas of the rear glass 2600 and the trunk garnish 2700 (S209).

After operation S209, the rear communication display device 2000 may determine whether to stop transmitting the information by determining the training information-based situation and information (S210).

After operation S210, when the rear communication display device 2000 determines to stop transmitting the information by determining the situation and the information (No in operation S210), it may maintain the information display optical system 2100 and the trunk garnish 2700 operational (S207).

After operation S210, when the rear communication display device 2000 determines to stop transmitting the information based on the situation and the information (Yes in operation S210), it may stop transmitting the communication display information (S211).

Figure 10:
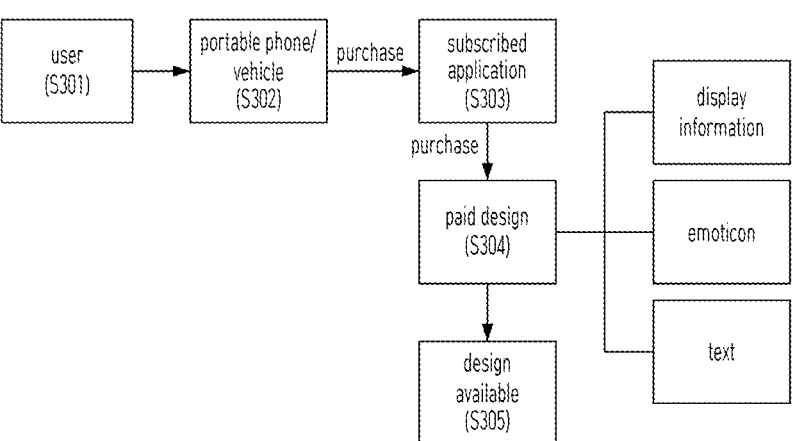
FIG. 10 is a diagram illustrating a design purchase method for a rear communication information device of a vehicle according to an embodiment of the disclosure.

FIG. 10 is a diagram illustrating a design purchase method for a vehicle rear communication information device according to an embodiment of the disclosure.

Referring to FIG. 10, a user may execute a subscribed application through at least one of a cell phone or a vehicle 1000 (S301, S302, and S303).

After operation S303, the user may purchase a paid design pre-stored in a server through the application (S304). At this time, the user may select at least one of display information, an emoticon, or text from among paid designs.

After operation S304, the rear communication display device 2000 may receive the selected paid design from the server and display the received paid design (S305).

According to any one of the embodiments of the disclosure, visibility may be improved by expanding a visible range, and driving safety may be further improved by proposing an optical system with the concept of displaying information only when necessary.

According to any one of embodiments of the disclosure, since a profile is pre-authenticated externally, pre-setting is possible for a designated seat before boarding, thereby increasing convenience.

In other words, the technical ideas of the disclosure may be applied to an autonomous vehicle as a whole or to only some configurations inside an autonomous vehicle. The scope of the disclosure should be determined in accordance with the appended claims.

In another aspect of the disclosure, the above-described proposals or inventive operations may also be provided as code that can be implemented, performed, or executed by a "computer" (a broad concept covering a system on chip (SoC) or microprocessor), or as an application, computer-readable storage medium, or computer program product storing or including the code, which also falls within the scope of the disclosure.

A detailed description of the preferred embodiments of the disclosure set forth above has been provided to enable those skilled in the art to implement and practice the disclosure. While the above description has been made with reference to the preferred embodiments of the disclosure, it will be understood by those skilled in the art that various modifications and changes can be made to the disclosure without departing from the scope of the disclosure. For example, those skilled in the art may use configurations in the above-described embodiments in combination with each other.

Accordingly, the disclosure is not intended to be limited to the embodiments set forth herein, but rather to give the broadest possible scope consistent with the principles and novel features disclosed herein.

What is claimed is:

1. A rear communication display device comprising:
an information display optical system configured to output rear communication display information to a rear glass, a trunk garnish or both, which are disposed at a rear of a vehicle; and

a controller configured to determine a display mode for outputting the rear communication display information and control the information display optical system to output the rear communication display information corresponding to the determined display mode,
wherein the determined display mode is one of a plurality of display modes including:
a manual mode in which the rear communication display information is output through a user operation, and
an automatic mode in which the rear communication display information is output based on a driving situation determined from navigation and camera information, and wherein the information display optical system includes:
a first optical system module disposed at a portion of the vehicle where a top end portion of the rear glass meets a roof of the vehicle and configured to output the rear communication display information to a first area of the rear glass;
a second optical system module disposed in an interior of the vehicle and configured to output the rear communication display information to a second area of the rear glass; and
a third optical system module disposed within the trunk garnish and configured to project the rear communication display information to an exterior surface of the trunk garnish.

2. The rear communication display device of claim 1, wherein:
the controller is configured, in response to determining that the display mode is the manual mode, to control the information display optical system to display a signal transmitted by the vehicle on the rear glass, the trunk garnish, or both, and
the rear communication display information in the manual mode includes at least one of directional information, deceleration information, stop information, and reverse information.

3. The rear communication display device of claim 1, wherein:
the controller is configured, in response to determining that the display mode is the automatic mode, configured to control the information display optical system to display, on the rear glass, the trunk garnish, or both, road condition information and emergency situation information obtained from the driving situation of the vehicle, and
the emergency situation information includes at least one of accident information and congestion information.

4. The rear communication display device of claim 1, wherein a portion of the third optical system module is configured to protrude outwardly from the trunk garnish and project the rear communication display information on the exterior surface of the trunk garnish.

5. A rear communication display device comprising:
an information display optical system configured to output rear communication display information to a rear glass, a trunk garnish or both, which are disposed at a rear of a vehicle; and
a controller configured to determine a display mode for outputting the rear communication display information and control the information display optical system to output the rear communication display information corresponding to the determined display mode,
wherein the determined display mode is one of a plurality of display modes including:

a manual mode in which the rear communication display information is output through a user operation, and an automatic mode in which the rear communication display information is output based on a driving situation determined from navigation and camera information, wherein the information display optical system includes:

a first optical system module disposed at a portion of the vehicle where a top end portion of the rear glass meets a roof of the vehicle and configured to output the rear communication display information to a first area of the rear glass;

a second optical system module disposed in an interior of the vehicle and configured to output the rear communication display information to a second area of the rear glass; and a third optical system module disposed within the trunk garnish and configured to output the rear communication display information to a surface of the trunk garnish, wherein the trunk garnish includes a fixed portion and a rotating portion, wherein the third optical system module is disposed on a rear surface of the fixed portion, wherein the rotating portion has a rotation shaft disposed at an end thereof and configured to rotate in an inward direction of the vehicle when a motor coupled to the rotation shaft is turned on, and wherein the third optical system module displays the rear communication display information on a front surface of the rotating portion.

6. A method for displaying rear communication display information on a vehicle, comprising:

determining a display mode for outputting the rear communication display information; and outputting the rear communication display information corresponding to the determined display mode, on a rear glass, a trunk garnish or both, which are disposed at a rear of the vehicle;

wherein the determined display mode is one of a plurality of display modes including:

a manual mode in which the rear communication display information is output through a user operation; and an automatic mode in which the rear communication display information is output by determining a driving situation based on navigation and camera information, and wherein outputting the rear communication display information corresponding to the determined display mode comprises:

outputting, using a first optical system module disposed at a portion of the vehicle where a top end portion of the rear glass meets a roof of the vehicle, the rear communication display information to a first area of the rear glass;

outputting, using a second optical system module disposed in an interior of the vehicle, the rear communication display information to a second area of the rear glass; and projecting, using a third optical system module disposed within the trunk garnish, the rear communication display information to an exterior surface of the trunk garnish.

7. The method of claim 6, wherein:

outputting the rear communication display information corresponding to the determined display mode comprises, in response to determining that the display mode is the manual mode, displaying a signal transmitted by the vehicle on the rear glass, the trunk garnish, or both, and the rear communication display information in the manual mode includes at least one of directional information, deceleration information, stop information, and reverse information.

8. The method of claim 6, wherein:

outputting the rear communication display information corresponding to the determined display mode comprises, in response to determining that the display mode is the automatic mode, displaying, on at least one of the rear glass, the trunk garnish, or both, at least one of road condition information and emergency situation information obtained from a driving situation of the vehicle, and the emergency situation information includes at least one of accident information and congestion information.

9. The method of claim 6, wherein the rear communication display information includes (1) an image shape including at least one of a pictogram and an emoticon, or (2) text of a preset length.

* * * * *